Patented May 30, 1944

2,349,979

UNITED STATES PATENT OFFICE

2,349,979

POLYMERIZATION OR POLYCONDENSATION PRODUCT AND THE METHOD FOR PRODUCING THE SAME

Otto Moldenhauer and Helmuth Bock, Hirschberg, Riesengebirge, Germany; vested in the Alien Property Custodian No Drawing. Application March 12, 1941, Serial No. 383,038. In Germany June 29, 1939

5 Claims. (Cl. 260—78)

This invention relates to a polymerization or polycondensation product and the method for producing the same, and more particularly to such a product which includes a bridge of two or more adjacently lying nitrogen atoms.

An object of this invention is to produce a new type or group of polymerization products which is particularly well adapted for the production of different types of artificial products.

Another object of this invention is the production of a suitable polymerization product capable of being formed into various artificial products.

Generally speaking, this invention relates to the production of materials of the group including polyhydrazides, polyhydrazones, polymeric azo compounds, polyhydrazo compounds, polyazoxy compounds, and further poly-condensates which may be designated as oxy-hydrazides, polydiazoamido compounds and similar classes of compounds as polyhydrazidine.

More specifically, the invention relates to the production of poly-condensation or polymerization products which involve reacting di-carbonyl compounds with hydrazine or its compounds and then polymerizing the reaction product. Such di-carbonyl compounds may include, for example, acids such as dicarboxylic acids or their derivatives, especially chloride, anhydrides and esters, and also di-aldehyde and diketone. Dicarboxylic acids will react, for example, with hydrazine to produce hydrazones. The resulting product can be polymerized to form an artificial product capable of forming plastic substances, films, fibers and the like, and, depending upon the final end product desired, may also be supplementarily treated. In this connection, the following supplementary treatments are contemplated:

The polymerized reaction product can be reduced into its corresponding polyazo-compounds; the polymerized reaction product can be hydrogenized into its corresponding polyhydrazo-compounds; the polymerized reaction product can be oxidized into its corresponding polyazoxy-compounds, the polymerized reaction products can be treated with ammonia to produce the corresponding polyhydrazidine.

The actual polymerization step may be varied in various ways known to the art. The polymerization can be effected by the action of raised temperature while the product is subjected to a vacuum. The polymerization can be stabilized at the desired stage by discontinuing the temperature elevation as, for example, by subjecting the product to a cooling action. The polymerization may be brought to a desired end point by adding an excess of one of the reaction constituents either at the beginning or during the course of the reaction, while an acceleration or delaying action upon the course of the reaction itself or upon the polymerization can be exercised by the addition of foreign materials, such as acids, basis, or salts.

The water or alcohol produced during the reaction can be removed by the use of the principle of the binary or ternary steam mix.

The produced intermediate product can be subjected to the usual dry spinning process either in a fused state with or without the addition of solvents or softening means or can be subjected to a wet spinning process in suitable solvents or thinning material with or without the addition of softening materials and other materials favorably influencing the spinning process. To the intermediate product there also may be added matting means or coloring material in solvent or pigment form before or during the course of the forming.

In mentioning above that di-aldehyde or diketone may be reacted with hydrazine, attention is directed to the fact that bisulphite compounds of such di-aldehydes or diketones are specifically contemplated. Also, while hydrazines have been mentioned, suitable hydrazine hydrates or their salts may also be used.

The following examples will indicate the manner in which the method according to the present invention is effected and the type of product produced thereby:

Example 1

128 parts of adipic acid anhydride and 50 parts of hydrazine hydrate are brought together. A violent reaction takes place after the conclusion of which the reaction product is heated for five hours to 150° C. The resulting reaction product which is a white body insoluble in the usual solvents is then converted by heating in a vacuum to 290° C. into a high polymeric compound. The polymerization product obtained is capable of being drawn into fibers and can either be spun into threads by means of a constant volume pump through interposed nozzles, or can be shaped by the use of pressure.

Example 2

286 parts of hexadecane dicarboxylic acid is heated with 50 parts of hydrazine hydrate for ten hours with the use of a reflux condenser until complete decomposition takes place. After the removal of the hydrate and reaction water, the reaction product is further treated in a vacuum at approximately 200° to 300° C. After approximately three hours of heating one obtains a polymerization product which has similar characteristics as in Example 1, and which can be treated in a similar manner to produce artificial products or fibers.

The fibers obtained by the methods according to this invention are characterized by extraordinarily high elasticity and strength, and have such a high fusion point that they are useful with advantage for textile and technical purposes.

While various processes for the production of various artificial material have been heretofore known to the art, it is believed that for the first time there is here disclosed a method for producing what may be termed an inorganic chain member in resinous artificial material. While various forms of the invention and methods for making the same have been disclosed, it is not intended that the invention be limited thereto except as is defined by the claims which follow.

We claim:

1. The method of producing a condensation or polymerization product capable of being formed, which includes the step of condensing hydrazine hydrate with a di-carbonyl substance chosen from the group consisting of adipic acid anhydride and hexadecane dicarboxylic acid, and then polymerizing the reaction product.

2. A new artificial material capable of being formed or spun, comprising the polymerized reaction product of hydrazine hydrate with a di-carbonyl substance chosen from the group consisting of adipic acid anhydride and hexadecane dicarboxylic acid.

3. The method of producing a plastic condensation or polymerization product comprising reacting approximately 128 parts of adipic acid anhydride and 50 parts of hydrazine hydrate, heating the product to about 150° C. for five hours and finally heating in a vacuum to 290° C. to produce a polymeric compound.

4. The method of producing a plastic condensation or polymerization product comprising refluxing approximately 286 parts of hexadecane dicarboxylic acid with 50 parts of hydrazine hydrate for about ten hours and finally heating the product to between 200° and 300° C. for about three hours to produce a polymeric compound.

5. The method according to claim 1, in which the polymerization is effected by an increase in temperature, and which includes the further step of stopping the polymerization at the desired stage by discontinuing the temperature elevation.

OTTO MOLDENHAUER.
HELMUTH BOCK.